(12) United States Patent
Tuico et al.

(10) Patent No.: US 12,043,157 B2
(45) Date of Patent: Jul. 23, 2024

(54) DEPLOYABLE ELASTOMERIC BOTTLE HOLSTER

(71) Applicant: B/E Aerospace, Inc., Winston-Salem, NC (US)

(72) Inventors: Roderico Tuico, Calamba (PH);
Margareth Rose T Recinto, Lipa (PH);
Jose Federico S Espiritu, Muntinlupa (PH)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/850,182

(22) Filed: Jun. 27, 2022

(65) Prior Publication Data
US 2023/0415629 A1   Dec. 28, 2023

(51) Int. Cl.
B60N 3/10   (2006.01)

(52) U.S. Cl.
CPC .................................. B60N 3/102 (2013.01)

(58) Field of Classification Search
CPC .......... B60N 3/102; B60N 3/10; B60N 3/108; A47G 23/02; A47G 23/0216; B60R 9/00
See application file for complete search history.

(56) References Cited

U.S. PATENT DOCUMENTS

| | | | | |
|---|---|---|---|---|
| 2,493,085 A * | 1/1950 | Pincus | ................... | A45C 3/045 |
| | | | | 383/127 |
| 3,141,257 A * | 7/1964 | Stull | ...................... | A01K 97/20 |
| | | | | 248/231.71 |
| 4,191,350 A * | 3/1980 | Ormond | ................. | A01K 97/04 |
| | | | | 248/311.2 |
| 5,954,394 A | 9/1999 | Czyzewski | | |
| 6,318,689 B1 * | 11/2001 | Rodriguez | ......... | A47G 23/0225 |
| | | | | 248/205.5 |
| D461,996 S * | 8/2002 | Liao | ....................... | B60N 3/107 |
| | | | | D7/620 |
| D496,197 S * | 9/2004 | Wenzler | ........................ | D6/716 |
| 7,021,825 B1 * | 4/2006 | Schultz | .................. | A47D 15/00 |
| | | | | 224/438 |

(Continued)

FOREIGN PATENT DOCUMENTS

| | | | | |
|---|---|---|---|---|
| CN | 2647140 Y1 | 10/2004 | | |
| EP | 3450246 A1 * | 3/2019 | ......... | A47G 23/0225 |

(Continued)

OTHER PUBLICATIONS

Extended European Search Report dated Oct. 24, 2023; European Application No. 23181811.3.

*Primary Examiner* — Anita M King
(74) *Attorney, Agent, or Firm* — Suiter Swantz IP

(57) ABSTRACT

A deployable elastomeric bottle holster for use with an aircraft passenger seat or other application. The holster includes a support bar to which a first elastomeric band is pivotally attached. A second elastomeric band is interconnected to the first elastomeric band through an intermediate collapsible mesh tube. In use, the mesh tube is collapsible to bring the first and second bands together to stow the bottle holster in a pocket or the like, and in a deployed condition the second band hangs below the first band by the mesh tube in an extended condition. The bottle holster may be constructed from elastic materials such as polyesters and polyurethanes for light weight, durability, performance, etc.

18 Claims, 3 Drawing Sheets

(56) References Cited

U.S. PATENT DOCUMENTS

| | | | |
|---|---|---|---|
| 7,510,157 B2 * | 3/2009 | Oliver | A47G 23/0225 224/400 |
| 7,841,658 B1 | 11/2010 | Marble | |
| 8,066,148 B2 * | 11/2011 | Garahan | A45F 5/02 220/737 |
| 8,540,310 B2 | 9/2013 | Suhre | |
| 8,641,004 B2 * | 2/2014 | Miklas | B60N 3/102 248/315 |
| 9,027,806 B1 * | 5/2015 | Gioggia | A45F 5/02 224/269 |
| 9,440,573 B1 * | 9/2016 | Dunham | B60N 3/107 |
| 9,549,616 B2 * | 1/2017 | Schilligo | A47C 7/624 |
| 9,610,879 B2 * | 4/2017 | Zheng | B60R 11/00 |
| 9,657,890 B2 * | 5/2017 | Botello | A47F 5/0846 |
| 10,293,943 B1 | 5/2019 | Pozzi et al. | |
| 10,377,315 B2 | 8/2019 | Hellman et al. | |
| 10,625,650 B1 | 4/2020 | Spencer | |
| 11,046,229 B1 * | 6/2021 | Natwick | B60N 3/106 |
| 11,084,409 B2 * | 8/2021 | Hirano | F16C 11/04 |
| 11,186,373 B1 | 11/2021 | Elliott et al. | |
| 11,718,338 B2 * | 8/2023 | Showell | B62B 9/20 280/47.38 |
| 2002/0145096 A1 * | 10/2002 | Eubanks | A47G 23/0225 248/311.2 |
| 2002/0148868 A1 * | 10/2002 | Dion-Bildstein | B60N 3/103 224/409 |
| 2006/0037825 A1 * | 2/2006 | Dayton | A47G 23/0225 190/110 |
| 2007/0241596 A1 | 10/2007 | Merrill | |
| 2008/0145172 A1 | 6/2008 | Sturt et al. | |
| 2009/0206098 A1 | 8/2009 | Garahan | |
| 2011/0101054 A1 | 5/2011 | Wicinski | |
| 2012/0139303 A1 * | 6/2012 | Westerink | B64D 11/0015 297/163 |
| 2013/0082491 A1 | 4/2013 | Rapkin | |
| 2015/0115650 A1 * | 4/2015 | Zhang | B60N 3/106 248/289.11 |
| 2017/0253159 A1 | 9/2017 | Lopatin | |
| 2018/0126691 A1 | 5/2018 | Bush et al. | |
| 2018/0236921 A1 | 8/2018 | Kondo | |
| 2018/0281653 A1 | 10/2018 | Guilhem et al. | |
| 2019/0283644 A1 | 9/2019 | Smith et al. | |
| 2022/0095799 A1 | 3/2022 | Hong et al. | |

FOREIGN PATENT DOCUMENTS

| | | |
|---|---|---|
| GB | 2356801 A | 6/2001 |
| WO | 2021221674 A1 | 11/2021 |

* cited by examiner

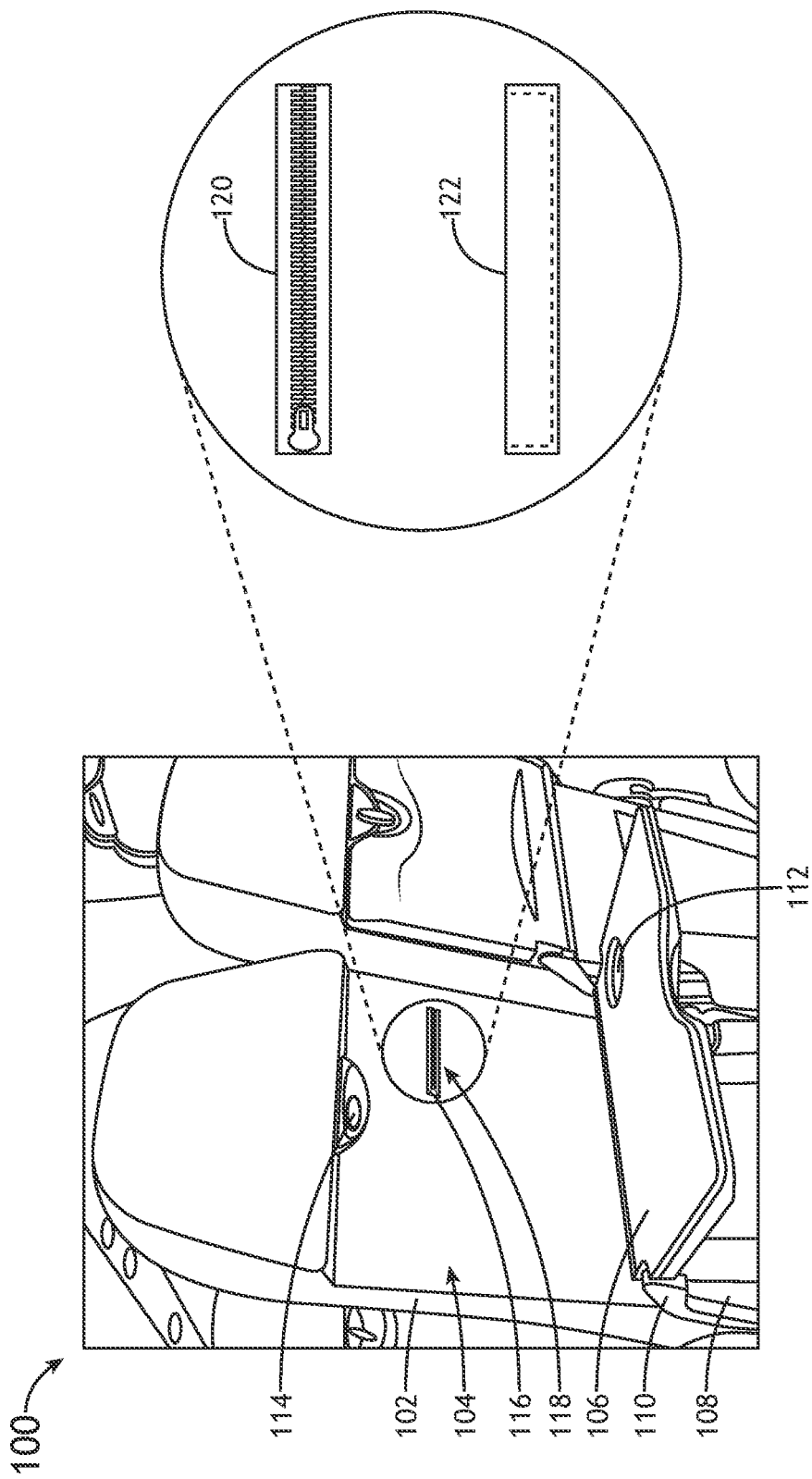

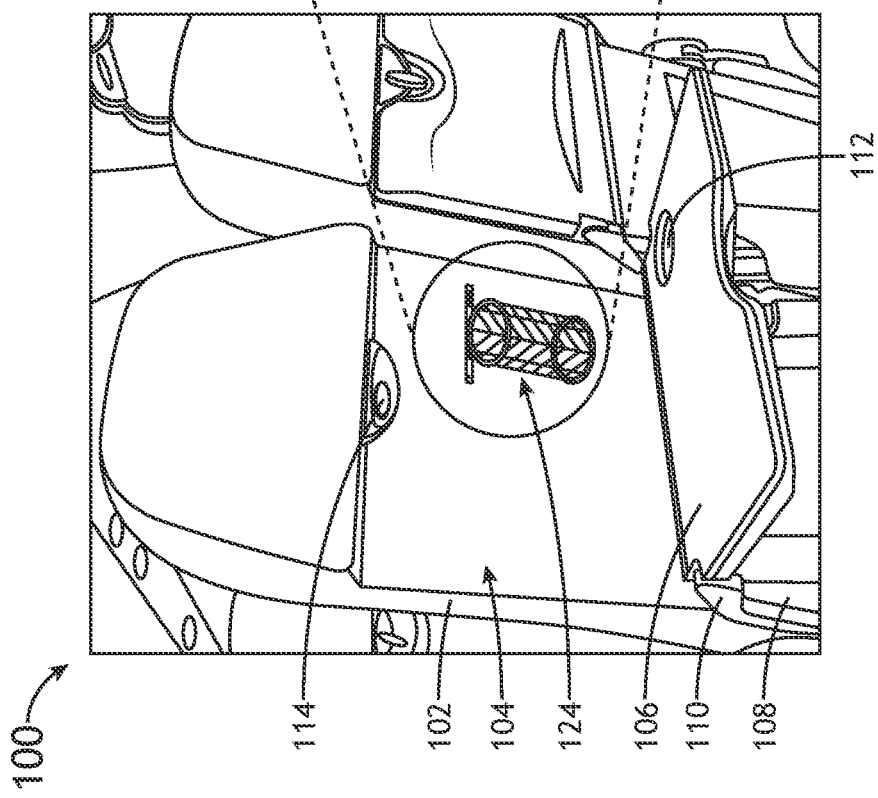
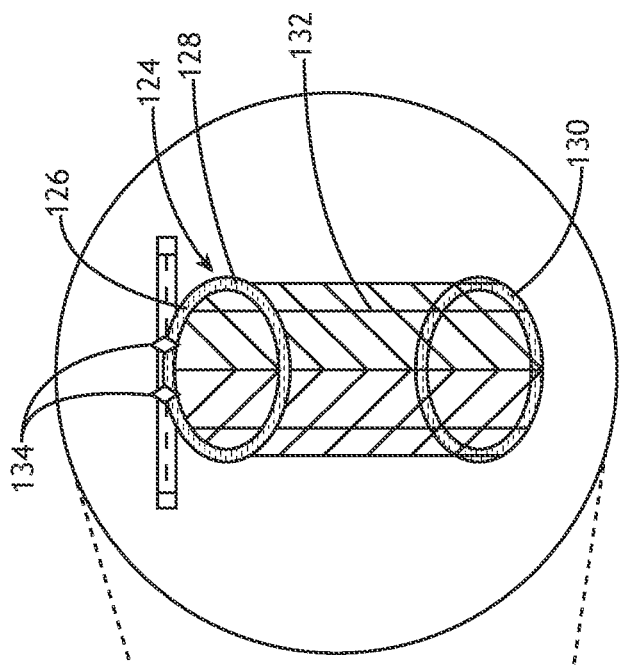
FIG. 2A
FIG. 2B

DEPLOYABLE ELASTOMERIC BOTTLE HOLSTER

TECHNICAL FIELD AND BACKGROUND

The present disclosure relates generally to beverage holders for use with vehicle passenger seats, and more particularly to a deployable elastomeric bottle holster for an aircraft passenger seat.

Vehicle cabins such as aircraft cabins are commonly configured with different seating classes. Each seating class includes passenger seats and passenger amenities. In business and premium seating classes where seat pitch and lateral spacing are maximized to enhance separation and privacy, seats may be fully adjustable and passenger amenities may be located around the seat. In economy seating classes wherein seat pitch is minimized to increase row density, passenger amenities are typically located immediately forward of each passenger seat, for instance on the backside of a forward seat, monument, or partition wall.

Typical passenger amenities include tray tables, beverage holders, video monitors, and literature pockets, among others. Most implementations of economy class passenger seats, with the exception of the front row and sometimes exit rows, locate these amenities on the back of a backrest of a forward seat. For example, the video monitor is typically located high on the backrest for use during taxi, takeoff and landing (TTOL) and flight, the tray table is typically located about the middle of the backrest to deploy to an ergonomic over-lap condition during flight, and literature pockets are typically located above or below the tray table.

Beverage holders, to which this application is directed, are typically associated with tray tables. For example, tray table beverage holders include a depression formed in the surface of the tray table or opening formed through the thickness of the tray table. Such beverage holders are only available for use when the tray table is deployed and thus cannot be used during TTOL. In addition, depressions are not sized to fit most carried-aboard beverage containers and do not hold containers at depth, and therefore containers seated in depressions are prone to tipping during flight.

While some solutions for beverage holders disassociated with tray tables can be used both during TTOL and flight, conventional solutions include rigid holders and linkages incorporated into the backrest shroud. Such solutions require dedicated space in the backrest for stowing the rigid parts between uses. To satisfy head impact criteria (HIC), rigid solutions must be positioned out of the way of a head strike and therefore are sometimes located on the side of the backrest requiring complex deployment mechanisms to position the beverage holder in an ergonomic use position. In addition, rigid solutions incorporated into the backrest shroud are not easily serviced, which is critically important for frequently used items subject to repeated movements.

Therefore, to overcome the disadvantages of prior art solutions, what is needed is a deployable beverage holder that is disassociated with other amenities, easily serviced, satisfies HIC, and is low cost and easy to use.

SUMMARY OF THE INVENTIVE ASPECTS

To achieve the foregoing and other advantages, the inventive aspects disclosed herein are broadly directed to a deployable elastomeric bottle holster for use with a passenger seat, monument, furniture, etc.

According to a first aspect, the present disclosure provides a deployable bottle holster including a support bar, a first elastomeric band coupled to the support bar, a second elastomeric band free of attachment to the support bar and to the first elastomeric band, and a collapsible mesh tube attached at one end to the first elastomeric band and at an opposing end to the second elastomeric band.

In some embodiments, the first elastomeric band is pivotally attached to the support bar such that the first elastomeric band is configured to pivot, relative to the support bar, between a generally vertical orientation corresponding to a deployed condition of the deployable bottle holster and a generally horizontal orientation corresponding to a stowed condition of the bottle holster.

In some embodiments, the collapsible holster forms a tubular body having a closed bottom and an open top when in a deployed condition of the deployable bottle holster, wherein the tubular body forms an interior space dimensioned to receive a beverage container.

In some embodiments, the collapsible mesh tube is made of at least one of polyester and polyurethane fabric.

In some embodiments, in a stowed condition of the deployable bottle holster the second elastomeric band is positioned proximal to the first elastomeric band, and in a deployed condition of the deployable bottle holster the second elastomeric band and the first elastomeric band are spaced apart by a distance equal to a longitudinal length of the collapsible mesh tube in a deployed condition of the collapsible mesh tube.

According to a second aspect, the present disclosure provides a passenger seat including a backrest, a pocket formed on a back side of the backrest, a support bar accessible inside the pocket, and a bottle holster removably attached to the support bar. The bottle holster generally includes a first elastomeric band, a second elastomeric band, and a collapsible mesh tube attached at one end to the first elastomeric band and attached at an opposing end to the second elastomeric band. In use, the bottle holster stows inside the pocket and deploys outside of the pocket.

In some embodiments, the pocket includes a zippered opening.

In some embodiments, the first elastomeric band is pivotally attached to the support bar such that the first elastomeric band is configured to pivot, relative to the support bar, between a generally vertical orientation corresponding to a deployed condition of the bottle holster and a generally horizontal orientation corresponding to a stowed condition of the bottle holster, and wherein when in the deployed condition the second elastomeric band hangs below the first elastomeric band and is supported by the collapsible mesh tube.

In some embodiments, the collapsible mesh tube forms a tubular body having a closed bottom and an open top when in a deployed condition of the bottle holster, the tubular body forming an interior space configured to receive a beverage container.

In some embodiments, the passenger seat further comprises a deployable tray table and the pocket is positioned behind the tray table in a closed condition of the tray table.

In some embodiments, the first elastomeric band is attached to the support bar using detachable hooks.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings:

FIG. 1A is a perspective view of a back of an exemplary aircraft passenger seat showing a location of a deployable bottle holster according to the present disclosure with the deployable bottle holster shown in a stowed condition;

FIG. 1B is a detailed view of FIG. 2A showing alternative pocket opening types;

FIG. 2A is a perspective view of a back of an exemplary aircraft passenger seat showing the deployable bottle holster in a deployed condition;

FIG. 2B is a detailed view of FIG. 2A showing the deployed condition of the bottle holster;

DETAILED DESCRIPTION

Figure 3B:
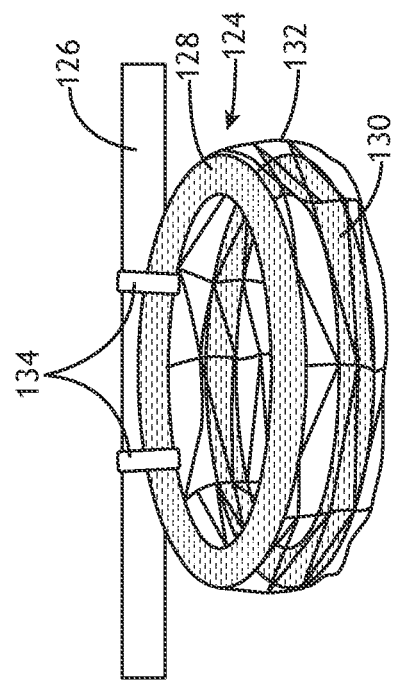
FIG. 3B shows the bottle holder in a collapsed condition for stowing.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly speaking, embodiments of the inventive concepts disclosed herein are directed to implementations of deployable beverage holsters for use with passenger seats such as economy class aircraft passenger seats.

Referring to FIG. 1A, a non-limiting example of an economy class aircraft passenger seat is shown generally at reference numeral 100. Known to those in the art of aircraft passenger seat construction, economy class passenger seats are typically configured in rows spaced apart longitudinally along the length of the economy class cabin. Each row typically includes an inboard seat or "aisle seat" and an outboard seat or "window seat," and in some cases at least one intermediate seat or "middle seat." Each individual passenger seat 100 typically includes a seat bottom and a backrest 102 supported on a frame, wherein the backrest has a front side support surface and a back side facing a like passenger seat. The back side 104 of the backrest 102 may be used to locate amenities dedicated for use by the facing the passenger in the aft seat.

As shown, passenger amenities include, but are not limited to, a tray table 106 and a literature pocket 108. In some passenger seat implementations, a video monitor (not shown) may be located on the back side above the stowed position of the tray table 106, such as on the back of the head rest. In use, the tray table 106 may be rotatably coupled to support arms 110 configured to support the tray table as it moves between a stowed condition against the back side 104 of the backrest 102 and a deployed horizontal condition apart from the seat. As shown for beverage holder comparison purposes, the tray table 106 includes a depression 112 formed in a top surface of the tray table for seating a beverage container. A latch 114 operates to latch the tray table 106 in the stowed condition during TTOL.

A pocket 116 located on the back side 104 of the backrest 102 forms an entrance 118 providing access to a concealed, deployable bottle holster according to the present disclosure. Referring to FIG. 1B, the pocket entrance may be zippered 120 or include a flap 122 that operates to maintain a closed condition of the pocket entrance between uses of the bottle holster. In use, the zipper is unzipped, or the flap opened to gain access into the pocket. The pocket 116, positioned in the interior space of the back rest 104 such as beneath the dress cover, is dimensioned to hold the bottle holster when in a stowed condition of the bottle holster. As shown, the pocket 116 is located behind the tray table 106 when in a stowed condition such that the bottle holster may be deployed when the tray table is deployed. Other pocket locations are envisioned including above, below and to the sides of the tray table such that the pocket holster is usable independent of the use of the tray table 104. In some embodiments, the pocket 116 is openable at least an amount to permit deployment of the bottle holster as discussed further below.

Referring to FIGS. 2A and 2B, the bottle holster 124 is shown in a deployed condition outside of the pocket 116. The bottle holster 124 is an assembly generally including a support bar 126, a pair of elastomeric bands 128, 130, and a collapsible mesh tube 132. In some embodiments, the support bar 126 is elongated and is disposed in the backrest 102 proximal the pocket entrance. As such, the support bar 126 is accessible via the pocket entrance for servicing and bottle holster replacement. The support bar 126 may be sewn, strapped, or otherwise fastened to the backrest or dress cover. The support bar 126 may be rigid or semi-rigid and is sufficiently secured in place to support the weight of a loaded bottle holster.

The pair of elastomeric bands includes a first band 128 and a second band 130. The first or "upper" band 128 is coupled to the support bar 126. In some embodiments, the first band 128 is pivotally attached to the support bar 126 using removably attachable hooks 134 that permit the first band to pivot relative to the support bar. In use, the first band 128 is manipulated by hand between a first position corresponding to a stowed condition in which the first band is inside the pocket and substantially vertical, and a second position corresponding to a deployed condition in the first band is outside the pocket and substantially horizontal. In some embodiments, the pocket entrance may be pulled open to allow the first band 128 to be retrieved and pulled from the pocket. The first band 128 may be elastomeric to permit folding for compact stowing, to stretch to accommodate different bottle sizes, and to give upon impact, among other purposes.

The second band 130 may be similar in construction and dimension to the first band 128. The first and second bands 128, 130 are interconnected by the collapsible mesh tube 132. In some embodiments, the mesh tube 132 includes an open mesh fabric having a closed end, an open top, and a longitudinal length. The first band 128 is attached to the open top end and the first band forms an entrance into the mesh tube 132. The second band 130 is attached to the closed end and defines the bottom of the bottle holster. When deployed, the second band 130 hangs below the first band 128 to open the throat of the mesh tube 132 for use. In some embodiments, the first band 128, the second band 130, and the mesh tube 132 are flexible and resilient to accommodate different bottle sizes and shapes.

Figure 3A:
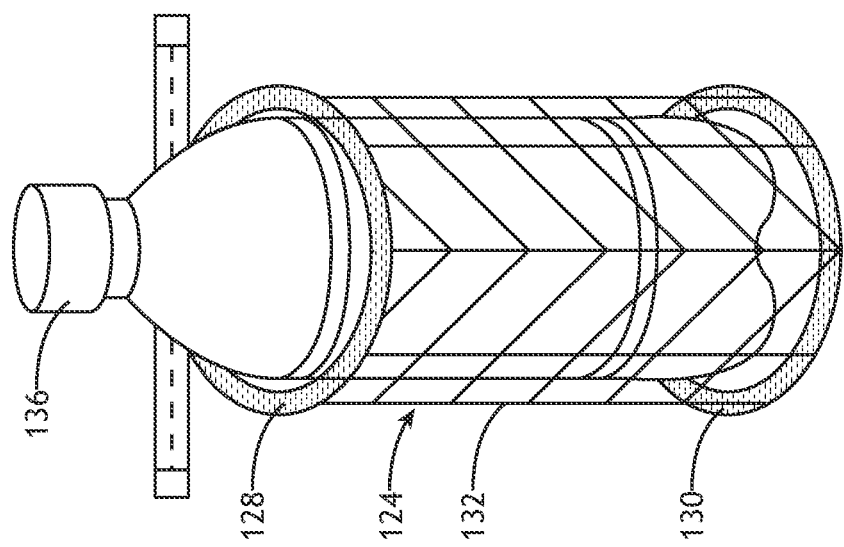
FIG. 3A sows the bottle holster removed from the seat, in a fully deployed condition, and holding a water bottle.

FIG. 3A shows the bottle holster 124 in use. In the deployed condition, the memory of the first band 128 opens the top end and the weight of the second band 130 elongates the mesh tube 132 to define the interior space for receiving a bottle 136. As used herein, the term "bottle" refers to any beverage container including, but not limited to, a bottle, container, cup, glass, etc. In some embodiments, the bottle holster 124 is a general holder configured to hold other items such as utensils, electronic devices, etc. The elasticity and resiliency of the first and second bands 128, 130 allows the bottle holster to have a relatively small size for stowing and then expand to accommodate larger containers. The elasticity and resiliency of the mesh tube 132 further acts to dampen motions.

FIG. 3B shows the bottle holster 124 in a stowed condition. In use, to stow the bottle holster 124, the second band 130 is lifted toward the first band 128 and the construction of the mesh tube 132 allows the tube to collapse. Thus, the configuration of the bottle holster 124 provides easy folding for compact packaging for stowing, and the memory of the bands automatically expands the bottle holster to the deployed condition. The hooks 134 attach to the support bar 126 and allow quick and simple replacement of the bottle holster as necessary.

In some embodiments, the bottle holster 124 is constructed from materials having performance properties suitable for use in aircraft, such as polyesters and polyurethan fabrics, among others.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A passenger seat including a backrest, comprising:
    a pocket formed on a back side of the backrest, the pocket accessible through a zippered opening;
    a support bar accessible inside the pocket; and
    a bottle holster coupled to the support bar, the bottle holster comprising:
        a first elastomeric band;
        a second elastomeric band; and
        a collapsible mesh tube attached at one end to the first elastomeric band and attached at an opposing end to the second elastomeric band;
    wherein, in use, the bottle holster stows inside the pocket and deploys outside of the pocket.

2. The passenger seat according to claim 1, wherein the first elastomeric band is pivotally attached to the support bar such that the first elastomeric band is configured to pivot, relative to the support bar, between a generally vertical orientation corresponding to a deployed condition of the bottle holster and a generally horizontal orientation corresponding to a stowed condition of the bottle holster, and wherein when in the deployed condition the second elastomeric band hangs below the first elastomeric band and is supported by the collapsible mesh tube.

3. The passenger seat according to claim 1, wherein the collapsible mesh tube forms a tubular body having a closed bottom and an open top when in a deployed condition of the bottle holster.

4. The passenger seat according to claim 1, wherein the collapsible mesh tube is made of polyester.

5. The passenger seat according to claim 1, wherein the collapsible mesh tube is made of polyurethane fabric.

6. The passenger seat according to claim 1, wherein when in a stowed condition of the bottle holster, the second elastomeric band is positioned proximal to the first elastomeric band, and when in a deployed condition of the bottle holster, the second elastomeric band and the first elastomeric band are spaced apart by a distance equal to a longitudinal length of the collapsible mesh tube in a deployed condition of the collapsible mesh tube.

7. The passenger seat according to claim 1, wherein the passenger seat further comprises a deployable tray table and the pocket is positioned behind the tray table in a closed condition of the tray table.

8. The passenger seat according to claim 1, wherein the first elastomeric band is attached to the support bar using detachable hooks.

9. A passenger seat including a backrest, comprising:
    a deployable tray table positioned on the backrest;
    a pocket positioned in the backrest, the pocket positioned behind the tray table when the tray table is stowed;
    a support bar positioned inside the pocket; and
    a bottle holster coupled to the support bar, the bottle holster comprising:
        a first elastomeric band;
        a second elastomeric band; and
        a collapsible mesh tube attached at one end to the first elastomeric band and attached at an opposing end to the second elastomeric band;
    wherein, in use, the bottle holster stows inside the pocket and deploys outside of the pocket.

10. The passenger seat according to claim 9, wherein the first elastomeric band is pivotally attached to the support bar such that the first elastomeric band is configured to pivot, relative to the support bar, between a generally vertical orientation corresponding to a deployed condition of the bottle holster and a generally horizontal orientation corresponding to a stowed condition of the bottle holster, and wherein when in the deployed condition the second elastomeric band hangs below the first elastomeric band and is supported by the collapsible mesh tube.

11. The passenger seat according to claim 9, wherein the collapsible mesh tube forms a tubular body having a closed bottom and an open top when in a deployed condition of the bottle holster.

12. The passenger seat according to claim 9, wherein the collapsible mesh tube is made of polyester or polyurethane fabric.

13. The passenger seat according to claim 9, wherein when in a stowed condition of the bottle holster, the second elastomeric band is positioned proximal to the first elastomeric band, and when in a deployed condition of the bottle holster, the second elastomeric band and the first elastomeric band are spaced apart by a distance equal to a longitudinal length of the collapsible mesh tube in a deployed condition of the collapsible mesh tube.

14. A passenger seat including a backrest, comprising:
a pocket positioned in the backrest;
a support bar positioned inside the pocket; and
a bottle holster coupled to the support bar, the bottle holster comprising:
a first elastomeric band;
detachable hooks attaching the first elastomeric band to the support bar;
a second elastomeric band; and
a collapsible mesh tube attached at one end to the first elastomeric band and attached at an opposing end to the second elastomeric band;
wherein, in use, the bottle holster stows inside the pocket and deploys outside of the pocket.

15. The passenger seat according to claim 14, wherein the first elastomeric band is pivotally attached to the support bar by the detachable hooks such that the first elastomeric band is configured to pivot, relative to the support bar, between a generally vertical orientation corresponding to a deployed condition of the bottle holster and a generally horizontal orientation corresponding to a stowed condition of the bottle holster, and wherein when in the deployed condition the second elastomeric band hangs below the first elastomeric band and is supported by the collapsible mesh tube.

16. The passenger seat according to claim 14, wherein the collapsible mesh tube forms a tubular body having a closed bottom and an open top when in a deployed condition of the bottle holster.

17. The passenger seat according to claim 14, wherein the collapsible mesh tube is made of polyester or polyurethane fabric.

18. The passenger seat according to claim 14, wherein when in a stowed condition of the bottle holster, the second elastomeric band is positioned proximal to the first elastomeric band, and when in a deployed condition of the bottle holster, the second elastomeric band and the first elastomeric band are spaced apart by a distance equal to a longitudinal length of the collapsible mesh tube in a deployed condition of the collapsible mesh tube.

* * * * *